United States Patent [19]
Neidhardt

[11] Patent Number: 5,220,149
[45] Date of Patent: Jun. 15, 1993

[54] LASER NOZZLE

[75] Inventor: Gerhard Neidhardt, Ditzingen, Fed. Rep. of Germany

[73] Assignee: Trumpf GmbH & Co., Ditzingen, Fed. Rep. of Germany

[21] Appl. No.: 770,563

[22] Filed: Oct. 3, 1991

[30] Foreign Application Priority Data

Oct. 6, 1990 [DE] Fed. Rep. of Germany ... 9013943[U]

[51] Int. Cl.⁵ .............................. B23K 26/14
[52] U.S. Cl. ....................... 219/121.67; 219/121.84
[58] Field of Search ............... 219/121.84, 121.67, 219/121.72; 372/109

[56] References Cited

FOREIGN PATENT DOCUMENTS

| | | |
|---|---|---|
| 0294324 | 12/1988 | European Pat. Off. ........ 219/121.84 |
| 3637568 | 5/1988 | Fed. Rep. of Germany ........................ 219/121.84 |
| 58-157587 | 9/1983 | Japan . |
| 0130789 | 6/1987 | Japan ................................. 219/121.84 |

Primary Examiner—C. L. Albritton

[57] ABSTRACT

A laser nozzle has an inner end adapted to be secured to a laser head and an outer end to be disposed adjacent a workpiece. An axial bore extends longitudinally therethrough with an inlet end and an outlet end and provides a passage therethrough for the laser beam and a cutting gas. The bore narrows at a point along its length spaced from the outlet end to define a throat portion in the bore, and at least one auxiliary rectilinear passage extending from the throat portion to the outer end of the nozzle adjacent the outlet end of the bore for passage of cutting gas therethrough. The nozzle, or the cutting head and nozzle, may be rotated to locate the auxiliary passage in a position trailing the laser beam. In another embodiment, a multiplicity of circumferentially spaced auxiliary passages may be opened or closed by a regulator to provide flow of cutting gas through passages which trial the laser beam.

17 Claims, 3 Drawing Sheets

LASER NOZZLE

BACKGROUND OF THE INVENTION

The present invention relates to an improved laser nozzle with an axially extending bore for the laser beam and the cutting gas and at least one auxiliary passage for the cutting gas disposed outwardly of the bore.

Laser nozzles are conventionally attached to a laser head and are fabricated in varied designs. Both the laser beam and the cutting gas flow through in an axial direction through the bore, and the gas is introduced at a suitable place through a channel in the laser head to flow into and thence through the bore with the laser beam. In this way, the laser beam and the cutting gas exit through the nozzle mouth and impinge upon the workpiece, which is usually underneath. Relative movement of the laser nozzle and workpiece causes a burn track to be produced in the workpiece as the metal is melted and oxidized. The cutting gas improves the burning process and at the same time "cleans" the burn track in the area of the point of burning produced by the laser beam.

Because the laser beam is narrowed or focused by a focusing device such as a lens, the passage in the laser head and the laser nozzle must be dimensioned and configured appropriately in the area of the focusing device. Thus, in the laser head the channel must have a certain minimum diameter for the focusing device, and the cross section of the channel or bore is thereafter reduced in the laser head and/or in the nozzle. This means that the longitudinal bore of the nozzle narrows at least once, and often several times, by reduced sections or by a continuous taper, or both, because the cross section of the bore is relatively narrow at the nozzle mouth.

It is also known to incorporate in such laser nozzles, auxiliary passages about the central bore for passage of some of the cutting gas through the nozzle to impinge upon the surface of the workpiece about the central bore.

It is an object of the present invention to provide a novel laser nozzle construction which is simple and inexpensive to fabricate and easy to change and which yields improved cutting results at high rates of feed of the workpiece relative to the laser cutting head.

It is also an object of the present invention to provide a laser head which increases the efficiency of the burning action provided by the cutting gas.

It is another object to provide an improved laser head construction utilizing such a novel laser nozzle so that the orientation of an auxiliary passage for the cutting gas can be optimized relative to the path of relative motion of the workpiece by the cutting head.

SUMMARY OF THE INVENTION

It has now been found that the foregoing and related objects may be readily attained by use of a laser nozzle having an inner end adapted to be secured to a laser head and an outer end adapted to be disposed adjacent a workpiece. The nozzle has an axial bore extending longitudinally therethrough with an inlet end and an outlet end, and the bore provides a passage therethrough for the laser beam and the cutting gas. This bore narrows at at least one point along its length spaced from the outlet end to define a throat portion in the bore. The nozzle also has at least one auxiliary rectilinear passage therein extending from the throat portion to the outer end of the nozzle adjacent the outlet end for passage of the cutting gas therethrough.

Preferably, the bore has a conical surface portion providing the narrowing and the throat, and the auxiliary passage(s) has a geometric axis which is angled in the direction of the outlet end towards the geometric axis of the bore. Usually, the bore is of generally circular configuration and a multiplicity of auxiliary passages are provided in spaced positions about the periphery of the throat, and their geometric axes lie on an imaginary conical surface having as its axis the geometric axis of the bore.

In some embodiments, the bore narrows at at least three points along its length to provide at least three throat portions and the auxiliary passage extends from an intermediate throat portion.

Preferably, the surface at the outer end of the nozzle has a recess therein about the outlet end of the bore, and the auxiliary passage(s) opens in the recess. In one embodiment, there is included a generally annular regulator in the bore disposed on the throat portion over the inner ends of the passages, and this regulator is of lesser diameter than the throat portion and is adapted to be moved transversely thereof to expose and block selected auxiliary passages. Means is included for effecting transverse movement of the regulator in two perpendicular directions.

The nozzle is attached to a laser cutting head mounted on a laser cutting machine which has a frame. In one embodiment, the laser cutting head is rotatably supported on the frame for rotation about its axis and the machine includes a controllable motor for rotation of the cutting head. A programmable control is operable to control the motor to effect rotation of the head and nozzle to orient the auxiliary passage(s) in a preselected position relative to the path of movement of the workpiece relative to the laser cutting head.

In another embodiment, the laser nozzle is rotatably supported in the laser head for rotation about its axis and the controllable motor rotates the laser nozzle.

DETAILED DESCRIPTION OF THE PREFERRED EMBODIMENT

In modern laser cutting machines with fixed laser nozzles and relative motion of a workpiece such as a sheet metal by an X-Y axis feed mechanism, movement in the X and/or Y direction is achieved by the programmable control of the laser cutting machine.

In accordance with the preferred embodiment of the present invention, it is possible for the control technician to set up the programmable control so that, at the same time that the workpiece is being moved relative to the laser cutting head, there is a corresponding rotation of the laser nozzle, or of the laser head with the laser nozzle, so that an auxiliary channel or channels for cutting gas trail or are disposed behind the relative path of motion of the laser beam.

Figure 1:
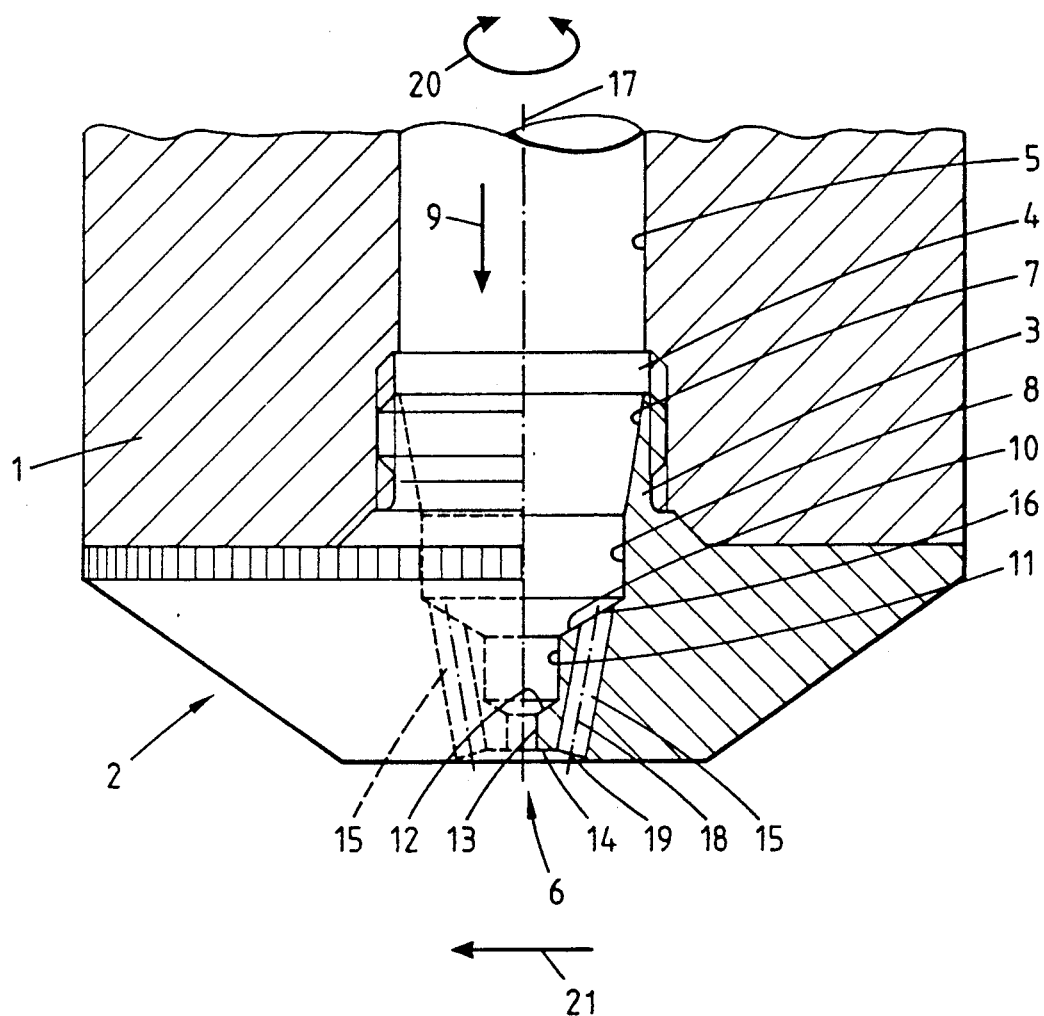
FIG. 1 is a fragmentary elevational view in partial section of the lower portion of a laser cutting head employing the improved nozzle of the present invention.

Turning first to FIG. 1, on its lower end the laser head generally designated by the numeral 1 carries a laser nozzle generally designated by the numeral 2. This nozzle has an externally threaded shank 3 which is threadably seated in an internally threaded portion 4 of the the nozzle end of the laser head 1. If desired, a sealing element may be provided at a suitable point between them.

The laser head 1 and laser nozzle 2 have a central axially extending longitudinal bore 5, through which the laser beam passes after going through a focusing device consisting of a lens (not shown) to the nozzle mouth 6. In addition, a cutting gas flows through this central longitudinal bore 5 and is introduced into the laser head 1 at any suitable place by a conduit (not shown). Thus, the cutting beam and the cutting gas exit through the mouth 6 of the laser nozzle 2.

As will be appreciated, the cross section of the central longitudinal bore 5 in the laser head 1 needs to be larger than in the nozzle 2. As a result, this longitudinal bore 5 must be reduced in cross section thereafter, and this narrowing of the cross section may be done in the laser 1 head and/or in the laser nozzle 2. In the illustrated embodiment, the central longitudinal bore 5 in the lower part of the laser head 1 has its cross section substantially uniform in dimension.

In the area of the threaded shank 3 of the laser nozzle 2, there is an initial reduction in the cross section of the bore 5 therethrough because of an initial conical surface portion 7 in the shank 3. There then follows a cylindrical portion 8 which is disposed immediately therebelow. Following in the direction of flow 9, there is then a second conical bore portion 10 which causes a sharper reduction in the cross sectional area. This is followed by a second cylindrical bore portion 11 in the flow direction, and then a third conical bore portion 13, and lastly a third cylindrical bore portion 13. In the preferred embodiment of the laser nozzle 2, the mouth 6 or outer end of the third cylindrical bore portion 13 is disposed within a recess 14 in the outer surface of the nozzle 2 which provides an inverted funnel configuration.

The outer ends of auxiliary channels 15 open into the recess 14 about the mouth 6 of the bore 5. In the embodiment in FIG. 1, the inner ends of the channels are disposed in the second throat of the center longitudinal bore 5 provided by the second conical bore portion 10. This makes it possible not only to use rectilinear auxiliary channels 15, but also to make them by use of a drill penetrating from the lower end or outer face. The several auxiliary channels 15 are arranged at regular intervals about the periphery of the bore 5 in the nozzle 2.

The cutting gas flowing into the nozzle 2 in this design flows out not only through the mouth 6 of the nozzle 2, but also through the auxiliary channels 15. Moreover, the entrance or inner end 16 of each auxiliary channel 15 is located on the throat formed by the second conical bore portion 10 of the laser nozzle 2. If the axis of the channels 15 were disposed radially outwardly in relation to the geometric axis 17 of the longitudinal bore 5, they would be disposed in the first conical bore portion 7. In this case, the axes would have to be somewhat parallel to the geometric axis 17. However, one or several auxiliary channels 15 may flow from each throat portion, even that defined by the third conical bore portion 12.

In this embodiment (and in that of FIGS. 2–3), each auxiliary channel 15 has its geometric axis 18 inclined to the the geometric axis 17. In this way, the geometric axis 17 of the longitudinal bore 5 and the geometric axes 18 of each auxiliary channel 15 intersect at a point outside the nozzle Z. Moreover, the geometric axes 18 o: the auxiliary channels 15 lie on an imaginary truncated cone inside the nozzle Z which has its theoretical apex pointed downwardly. As already explained, the outer mouth or lower end 19 of each auxiliary channel 15 is in the recess 14 about the third cylindrical portion 12 of the laser nozzle 2.

If so desired, and in a manner not shown, the laser nozzle 2 of FIG. 1 may be supported on the laser head 1 so that it can rotate 360° about the geometric axis 17 of the laser head 1, as indicated by the double headed arrow 20. To permit this, the threaded connection between the laser head 1 and the laser nozzle 2 would be replaced.

Figure 4:
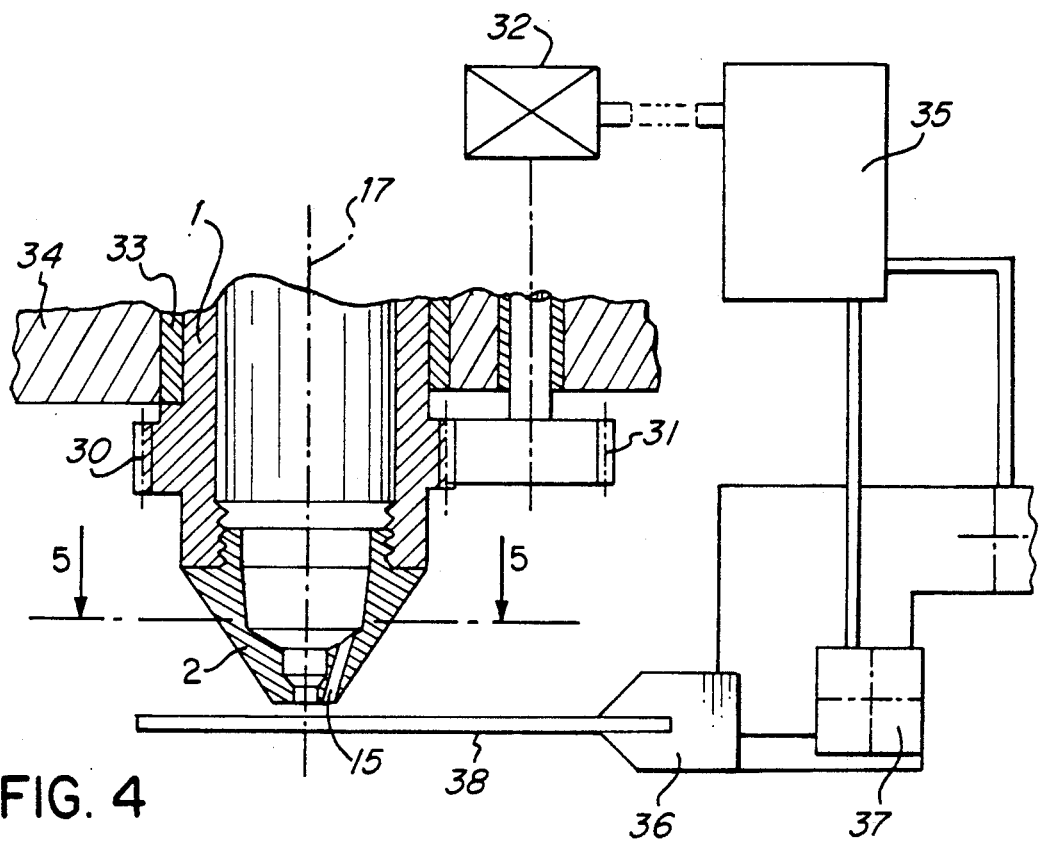
FIG. 4 is a partially diagrammatic view of a laser head mounted on a laser cutting machine and including the means for effecting rotation of the laser cutting head about its axis so as to change the disposition of the auxiliary passage(s) in the laser nozzle.

However, the laser head 2 may be rotatably driven so that it turns together with the laser nozzle 1 about an angle of 360° in relation to the laser cutting machine, as illustrated in FIG. 4. This is effected by providing a toothed ring 30 about the lower portion of the laser head 1, and this ring 30 meshes with a pinion gear 31 driven by a controllable motor 32. The rotating laser head 1 is rotatably supported in the bushing 33 of the machine frame 34. The motor 32 is controlled by the programmable control 35 which also controls the clamping mechanism 36 and the X-Y guidance system 37 of the laser cutting machine to move the workpiece 38 relative to the cutting head 1 and nozzle 2.

In this variation of the invention, only one auxiliary channel 15 is provided, but several auxiliary channels 15 may be spaced about a portion of the periphery of the bore 5.

Figure 5:
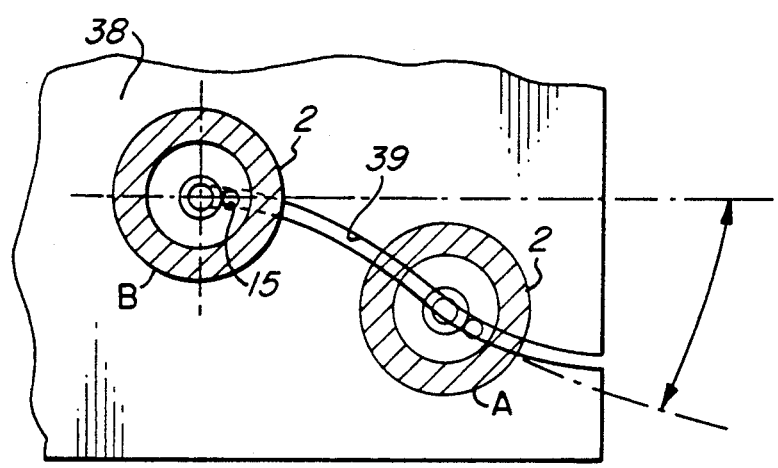
FIG. 5 is a schematic view showing the rotation of the laser head and nozzle in the embodiment of FIG. 4 as the workpiece is moved thereunder along a non-rectilinear path.

By turning the head 1, additional stream(s) of cutting gas exit the auxiliary channel or channels 15 behind the laser beam in the direction in which the laser burn track 39 is being produced in the workpiece 38 as seen in FIG. 5 in the movement from Point A to Point B. In this manner, the cutting gas is used most efficiently. In this way, one can save gas or provide a higher gas flow by the single or a few auxiliary channels 15 to provide a predetermined quantity of gas per unit of time.

Figure 2:
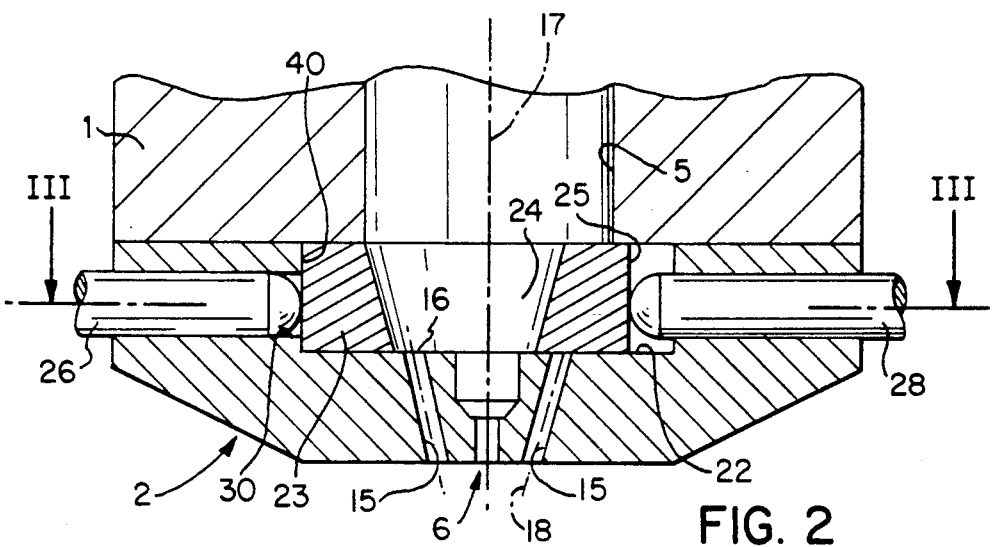
FIG. 2 is a cross sectional view of another embodiment of the laser nozzle of the present invention as mounted on a laser cutting head and with its flow controlling regulator disposed at one position thereof.
Figure 3:
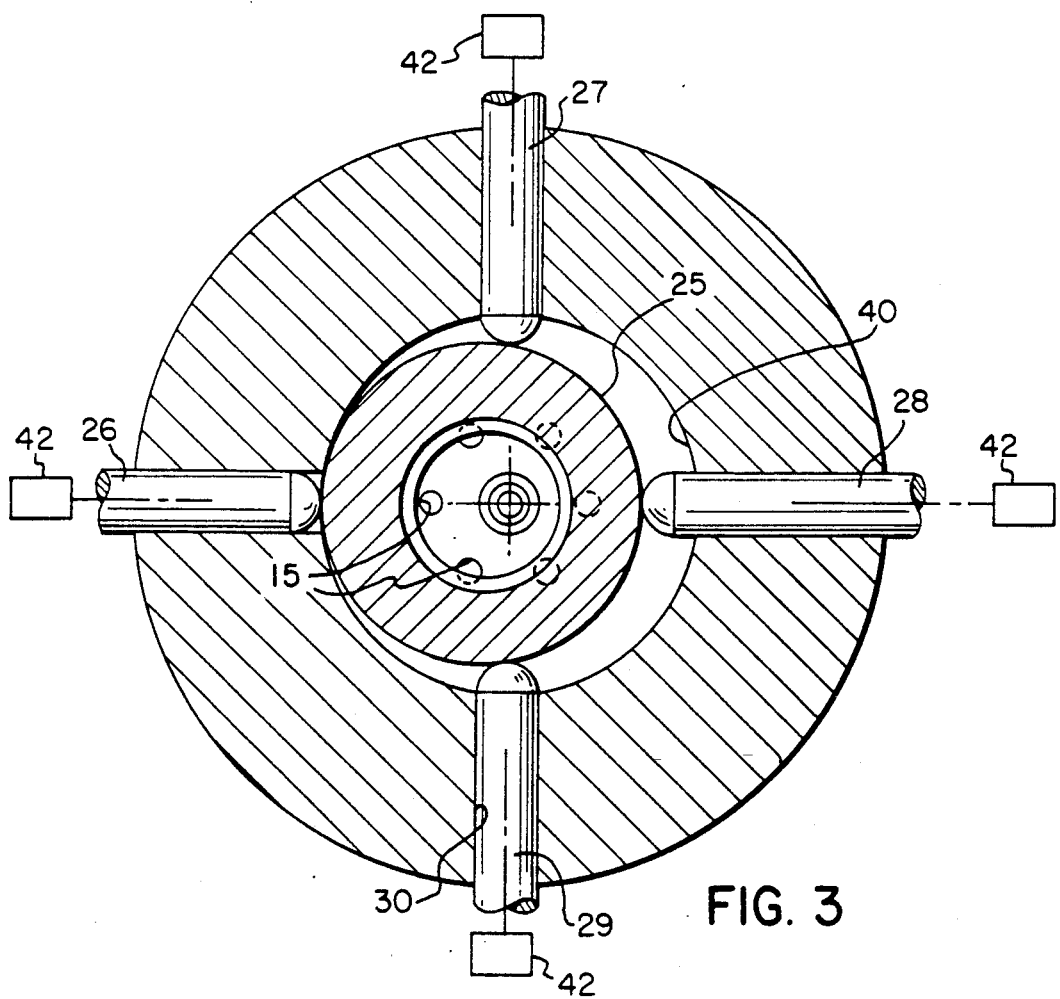
FIG. 3 is a cross sectional view thereof along the lines III—III of FIG. 2.

In the embodiment of the invention shown in FIGS. 2 and 3, the inner ends 16 of the auxiliary channels 15 are on a horizontal transverse surface 22 of the nozzle 2. They are arranged concentrically about the geometric axis 17 of the nozzle 2. In addition, their axes 18 are inclined in the same manner as those of the auxiliary channels 15 of the embodiment of FIG. 1. The nozzle 2 may also have a funnel-shaped recess at the outer or lower ends 19 of the auxiliary channel 15 which corresponds to the funnel-shaped recess 14 in FIG. 1.

On the horizontal transverse surface 22 of the nozzle 2 there is disposed a ring shaped or annular distributing regulator 23 which has a central bore 24 narrowing conically in the direction of gas flow therethrough. The outer surface 25 of the regulator 23 is cylindrical and is disposed in a cylindrical recess 40 formed in the nozzle 2. Adjacent the cylindrical surface 25 are the inner ends of four control bolts, 26, 27, 29 and 29 which are slidably seated in radially extending passages 30 in the nozzle 3. Control bolts 26 and 28 are disposed in the X direction of the laser cutting machine, while control bolts 27 and 29 extend in the Y direction. It can be seen that one can push the distributing regulator 23 as desired within the X-Y plane by moving the control bolts 26-29 inwardly and outwardly of the recess 40. The control bolts 26-29 are activated by adjustable motors 42 which can be controlled by the control 35 on the laser cutting machine already described. As seen in FIG. 2, the central bore 24 is narrowed so that the cutting gas coming through the central longitudinal bore 5 can always flow through only one or a few of the auxiliary channels 15. The regulator 23 is controlled so that the cutting gas always can flow only through the auxiliary channel(s) 15 which trails or is behind the laser beam in the feed direction of the workpiece so that the laser gas coming out is blown principally into the slot already formed by the laser beam. As soon as the slot goes in another direction, the regulator 23 is moved accordingly The control 26-29 are sealed in their respective bore 30 so that the cutting gas, which is under pressure, cannot flow outwardly therethrough. However, the nozzle 2 can also be used without the regulator 23 and it is also attached at the lower end of the laser head 1 in any suitable manner such as the threaded engagement of FIG. 1.

Thus, it can be seen that if there is at least one auxiliary channel in the laser nozzle which connected between the central bore or the laser head and the outer end of the nozzle, then the cutting gas in the bore can flow both through the longitudinal bore and also through the auxiliary channel(s). The auxiliary channels are arranged and their flow direction is chosen so that the cutting gas flowing out of them impinges close to the burn point on the workpiece. It has been shown that through this controlled use of the cutting gas, i.e., by the more favorable flow of the cutting gas, the cut edge on the workpiece can be improved, especially at high rates of feed speed for the workpiece relative to the cutting head. This is especially true when the cutting gas is blown out of the auxiliary channel or at least one of the auxiliary channels more or less directly into the cutting track or slot being produced by the laser beam.

As can be seen from the illustrated embodiments, this does not involve a structurally complicated laser nozzle design. Moreover, it is simple to fabricate the auxiliary channel or channels so that they originate in the nozzle bore and provide the gas at the predetermined place on the workpiece because of the location of their outer ends.

The place in the bore where the auxiliary channels originate may be a surface running perpendicularly to the longitudinal axis of the nozzle, or it can be an inwardly indented surfaces. It is preferably a conically disposed surface providing a conical throat in the flow direction.

In the preferred structure, the inner end of each auxiliary channel is disposed on a conical throat surface, and each channel axis is rectilinear so that it runs in a straight line. This makes it possible to design the auxiliary channels as bores which may be readily drilled. By assigning all the inner ends to a throat or conical surface, this creates favorable conditions from the standpoint of gas flow.

By having each auxiliary channel inclined to the nozzle axis, the geometric axes of the longitudinal bore and of each of the auxiliary channels meet at an imaginary point outside the laser nozzle. However, because the cutting gas can come out at very high speeds and the distance from the nozzle to the workpiece is relatively short, it is not essential that the geometric axes intersect precisely at a single point. In addition, the burn point cannot be defined exactly for a sheet metal workpiece which is several millimeters thick or more. As a result, when cutting at the geometric axis of the nozzle bore, it is not especially important whether the theoretical intersection of the geometric axes lies on the surface of the workpiece or somewhat further inside in the workpiece or even under it. Of course, it must be in the area of the burn point being generated by the laser beam.

A preferred version of the invention is one in which the laser nozzle has several throats, one behind the other in the flow direction, and the auxiliary channel or channels flow from the second throat in the flow direction. This causes an early diversion of the gas flow to the auxiliary channel or channels in the nozzle area.

By providing the inverted funnel-type recess at the outer mouth of the bore and in which the outer ends of each auxiliary channel lie, the individual partial streams of gas exiting from the auxiliary channels can surround the laser beam in its path between the nozzle and the workpiece.

Although the laser nozzle may be threadably engaged in the laser head, one or both of the laser head and the laser nozzle may have bearing supports so that they can be rotated and driven by a controllable motor in either direction of rotation. In this embodiment, the nozzle may have only one auxiliary channel or auxiliary channels only about part of its periphery. If the gas flowing out of the auxiliary channel or channels is provided so that it is primarily blown into the slot being produced by the laser beam, there is a substantial saving in gas volume necessary to produce the oxidation of the molten metal over that required if a ring of auxiliary channels had been used. Thus, it is possible to use only one channel, or a few channels spaced closely about only a portion of the periphery of the nozzle bore. Blowing the gas in the part of the molten slot which is being produced is then most effective if the auxiliary channel or the group of auxiliary channels is arranged so that they trail behind the laser beam in the direction in which the slot is being produced. Since the slot produced does not always run in a straight line but may have any shape, the goal sought can be achieved when either (1) the laser nozzle has bearings and rotates relative to the laser head on its longitudinal axis or (2) the laser head is designed to rotate with the nozzle in the laser cutting machine about the geometric axis of the longitudinal bore.

However, as shown, a movable distributor ring also may provide for the desired opening and closing of the auxiliary channels to provide the effective flow of the gas in the slot trailing the laser beam.

Thus, it can be seen that the laser nozzles of the present invention are simple and inexpensive to fabricate, easy to change and provide improved cutting results at high workpiece feed rates. The laser head assemblies permit controlled orientation of auxiliary gas flow passages to direct cutting gas into the slot of molten metal being generated by the laser beam to increase the efficiency of the cutting gas.

Having thus described the invention, what is claimed is:

1. A laser nozzle having an inner end adapted to be secured to a laser head and an outer end to be disposed adjacent a workpiece, said nozzle having an axial bore extending longitudinally therethrough with an inlet end and an outlet end and providing a passage therethrough for the laser beam and a cutting gas, said bore being of generally circular cross section and narrowing at a point along its length spaced from said outlet end to define a throat portion in said bore, said nozzle also having a multiplicity of auxiliary rectilinear passages therein spaced about the periphery of said throat portion and extending from said throat portion to the outer end of said nozzle adjacent said outlet end for passage of cutting gas therethrough from said bore, said auxiliary passages having geometric axes which are angled in the direction of said outlet end towards the geometrix axis of said bore and lying on an imaginary conical surface having as its axis the geometric axis of said bore.

2. The laser nozzle in accordance with claim 1 wherein said bore has a conical surface portion providing said narrowing and said throat.

3. The laser nozzle in accordance with claim 1 wherein said bore narrows at least three points along its length to provide at least three portions and said auxiliary passage extends from an intermediate throat portion.

4. A laser nozzle having an inner end adapted to be secured to a laser head and an outer end to be disposed adjacent a workpiece, said nozzle having an axial bore extending longitudinally therethrough with an inlet end and an outlet end and providing a passage therethrough for the laser beam and a cutting gas, said bore narrowing at a point along its length spaced from said outlet end to defining a throat portion in said bore, said nozzle also having at least one auxiliary rectilinear passage therein extending from said throat portion to the outer end of said nozzle adjacent said outlet end for passage of cutting gas therethrough, the surface at said outer end of said nozzle having a recess therein about said outlet end of said bore, said auxiliary passage opening in said recess.

5. The laser nozzle in accordance with claim 1 wherein the inner end portion of said nozzle is threaded for engagement with an associated laser head.

6. A laser nozzle having an inner end adapted to be secured to a laser head and an outer end to be disposed adjacent a workpiece, said nozzle having an axial bore extending longitudinally therethrough with an inlet end and an outlet end and providing a passage therethrough for the laser beam and a cutting gas, said bore having a conical surface portion at a point along its length spaced from said outlet end and providing a narrowing of said bore defining a throat portion in said bore, said nozzle also having a multiplicity of auxiliary rectilinear passages therein extending from said throat portion to the outer end of said nozzle adjacent said outlet end for passage of cutting gas therethrough, said auxiliary passage having a geometric axis which is angled in the direction of said outlet end towards the geometric axis of said bore, said auxiliary passages being provided in spaced positions about the periphery of said throat, the geometric axes of said auxiliary passages lying in an imaginary conical surface having as its axis the geometric axis of said bore.

7. The laser nozzle in accordance with claim 6 wherein said bore narrows at least three points along its length to provide at least three throat portions and said auxiliary passages extend from an intermediate throat portion.

8. The laser nozzle in accordance with claim 6 wherein the surface at the outer end of said nozzle has a recess therein about said outlet end of said bore and said auxiliary passages open in said recess.

9. The laser cutting machine in accordance with claim 1 wherein there is included a generally annular regulator in said bore disposed on said throat portion, said regulator being of lesser diameter than said throat portion and being adapted to be moved transversely thereof to expose and block selected auxiliary passages.

10. The laser cutting machine in accordance with claim 9 wherein there is included means for effecting transverse movement of said regulator in two perpendicular directions.

11. A laser cutting machine comprising:
   (a) a frame;
   (b) a laser cutting head supported on said frame and having an outer end, said head having a passage therein opening at said outer end for the laser beam and an inlet passage for cutting gas to flow into said laser beam passage and outwardly of said outer end; and
   (c) a laser nozzle having its inner end engaged with the outer end of said laser cutting head and an outer end adapted to be disposed adjacent a workpiece, said nozzle having an axial bore extending longitudinally therethrough with an inlet end communicating with said passage in said laser cutting head, and an outer end to be disposed adjacent a workpiece, said nozzle having an axial bore extending longitudinally therethrough with an inlet end and an outlet end and providing a passage therethrough for the laser beam and cutting gas, said bore being of generally circular cross section and narrowing at a point along its length spaced from said outlet to define a throat portion in said bore, said nozzle also having a multiplicity of auxiliary rectilinear passages therein spaced about the periphery of said throat portion and extending from said throat portion to the outer end of said nozzle adjacent said outlet end for passage of cutting gas therethrough from said bore, said auxiliary passages having geometric axes which are angled in the direction of said outlet end towards the geometric axis of said bore and lying on an imaginary conical surface having as its axis the geometric axis of said bore.

12. The laser cutting machine in accordance with claim 11 wherein said laser cutting head is rotatably supported on said frame for rotation about its axis and wherein said machine includes a controllable motor for rotation of said cutting head.

13. The laser cutting machine in accordance with claim 12 wherein said machine includes a programmable control for said motor to effect rotation of said head and nozzle to orient the auxiliary passage(s) in a preselected position relative to the path of movement of an associated workpiece relative to the laser cutting head.

14. The laser cutting machine in accordance with claim 11 wherein said laser nozzle is rotatably supported in said laser head for rotation about its axis and wherein said machine includes a controllable motor for rotation of said laser nozzle.

15. The laser cutting machine in accordance with claim 14 wherein said machine includes a programmable control for said motor to effect rotation of said laser nozzle to orient the auxiliary passage(s) in a preselected position relative to the path of movement of an associated workpiece relative to the laser cutting head.

16. A laser cutting machine comprising:
   (a) a frame;
   (b) a laser cutting head supported on said frame and having an outer end, said head having a passage therein opening at said outer end for the laser beam and an inlet passage for cutting gas to flow into said laser beam passage and outwardly of said outer end;
   (c) a laser nozzle having its inner end engaged with the outer end of said laser cutting head and an outer end adapted to be disposed adjacent a workpiece, said nozzle having an axial bore extending longitudinally therethrough with an inlet end communicating with said passage in said laser cutting head, and an outer end to be disposed adjacent a workpiece, said nozzle having an axial bore extending longitudinally therethrough with an inlet end and an outlet end and providing a passage therethrough for the laser beam and cutting gas, said bore narrowing at a point along its length spaced from said outlet and defining a throat portion in said bore, said nozzle also having at least one auxiliary rectilinear passages therein extending from said throat portion to the outer end of said nozzle adjacent said outlet end for passage of cutting gas therethrough; and
   (d) a generally annular regulator in said bore of said laser nozzle disposed in said throat portion, said regulator being of lesser diameter than said throat portion and being adapted to be moved transversely thereof to expose and block selected auxiliary passages.

17. The laser cutting machine in accordance with claim 16 wherein said machine includes means for effecting transverse movement of said regulator in two perpendicular directions.

* * * * *

UNITED STATES PATENT AND TRADEMARK OFFICE
CERTIFICATE OF CORRECTION

PATENT NO. : 5,220,149
DATED : June 15, 1993
INVENTOR(S) : Gerhard Neidhardt

It is certified that error appears in the above-indentified patent and that said Letters Patent is hereby corrected as shown below:

Column 7, line 26, after "three", insert --throat--.; line 36, please delete "to" and insert --and--.

Column 10, line 6, please delete "passages" and insert --passage--.

Signed and Sealed this

Fifth Day of April, 1994

Attest:

BRUCE LEHMAN

Attesting Officer

Commissioner of Patents and Trademarks